United States Patent
Satoh et al.

(10) Patent No.: US 6,631,049 B2
(45) Date of Patent: Oct. 7, 2003

(54) SEALED STRUCTURE FOR AN ELECTRONIC DEVICE

(75) Inventors: Ichi Satoh, Kawasaki (JP); Shoji Samma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 09/800,325

(22) Filed: Mar. 6, 2001

(65) Prior Publication Data

US 2002/0030923 A1 Mar. 14, 2002

(30) Foreign Application Priority Data

Sep. 4, 2000 (JP) ........................................ 2000-267620

(51) Int. Cl.⁷ .............................. G11B 33/14; F16J 15/10
(52) U.S. Cl. ................... 360/97.02; 369/75.1; 277/632; 277/638
(58) Field of Search ........................... 360/97.01, 97.02, 360/97.03; 277/590, 628, 632, 637, 638–640, 641, 642, 643; 369/75.1

(56) References Cited

U.S. PATENT DOCUMENTS

| 3,993,102 A | * | 11/1976 | Polster et al. ................. 138/89 |
| 4,865,517 A | * | 9/1989 | Beehler ................... 415/214.1 |
| 5,293,282 A | * | 3/1994 | Squires et al. ............ 360/77.08 |
| 5,301,075 A | * | 4/1994 | Takemoto ................ 360/97.02 |
| 5,422,766 A | * | 6/1995 | Hack et al. ............... 360/97.02 |
| 5,582,411 A | * | 12/1996 | Tyler ........................... 277/650 |
| 5,600,091 A | * | 2/1997 | Rose ........................ 174/35 R |
| 5,687,975 A | * | 11/1997 | Inciong ....................... 277/591 |
| 6,052,255 A | * | 4/2000 | Kawabe et al. .......... 360/97.02 |
| 6,392,838 B1 | * | 5/2002 | Hearn et al. .............. 360/97.02 |
| 2002/0089782 A1 | * | 7/2002 | Hearn et al. .............. 360/97.02 |
| 2002/0114104 A1 | * | 8/2002 | Hearn et al. .............. 360/97.01 |

FOREIGN PATENT DOCUMENTS

| FR | 2672656 A3 | * | 8/1992 |
| JP | 6-1248280 A | * | 11/1986 |
| JP | 2-199691 A | * | 8/1990 |
| JP | 3-283076 A | * | 12/1991 |
| JP | 4-132068 A | * | 5/1992 |
| JP | 4-258872 A | * | 9/1992 |
| JP | 5-79126 | | 10/1993 |
| JP | 6-342589 A | * | 12/1994 |
| JP | 7-181580 A | * | 7/1995 |
| JP | 10-102235 A | * | 4/1998 |

OTHER PUBLICATIONS

"Multicontact Flexible Seal," Jul. 1, 1975, IBM Technical Disclosure Bulletin, vol. No. 18, Issue No. 2, p. 52.*

* cited by examiner

Primary Examiner—William Klimowicz
(74) Attorney, Agent, or Firm—Greer, Burns & Crain Ltd.

(57) ABSTRACT

A sealed structure for an electronic device, the sealed structure includes a base, a concave cover enclosing electronic components of the electronic device when the cover is fitted to the base, and a gasket-like sealing member that fits between edge portions of the cover and the base to seal the enclosure. A rib portion is formed on at least one of either the cover or the base so as to prevent the sealing member from protruding from the edge portions of the cover and base, thus providing an improved seal.

5 Claims, 11 Drawing Sheets

SEALED STRUCTURE FOR AN ELECTRONIC DEVICE

BACKGROUND OF THE INVENTION

1. Field of the Invention

The present invention relates to a sealed structure for an electronic device, and more particularly, to a sealed structure for a magnetic disk drive unit.

2. Description of Related Art

Electronic devices are typically built in such a way as to bring related components together in order to enable the device to function effectively, or, increasingly, to make the device as a whole more compact. In either case, the design or layout of the components is accommodated within a substantially rectangular or box-like housing. In such cases, depending on the type of electronic device involved the housing must often be sealed with a high degree of precision.

For example, in the case of a magnetic disk drive, in which the recording and reproduction of information to and from a rotary disk-like recording medium occurs in an interval between a surface of the disk and a magnetic head, that interval is very small, that is, on the order of microns. As the density with which information is being recorded to and reproduced from recording media continues to increase, head-to-disk intervals on the order of sub-microns are being sought.

The need for head-to-disk spacing accurate to the micron or sub-micron level means that any degradation in the quality of the seal of the magnetic disk drive such as would allow dust particles and the like into the interior of the device has the potential to disrupt the stability of the head as it floats over the surface of the disk, potentially causing the head and the rotating disk to come into contact with each other and causing head crashes and other undesirable events.

Thus, magnetic disk drives in particular require properly sealed structures. In order to further an understanding of the problem the present invention attempts to solve as well as of the invention itself, a description will now be given of the conventional magnetic disk drive sealed structure with reference to FIGS. 1 through 6.

Figure 1:
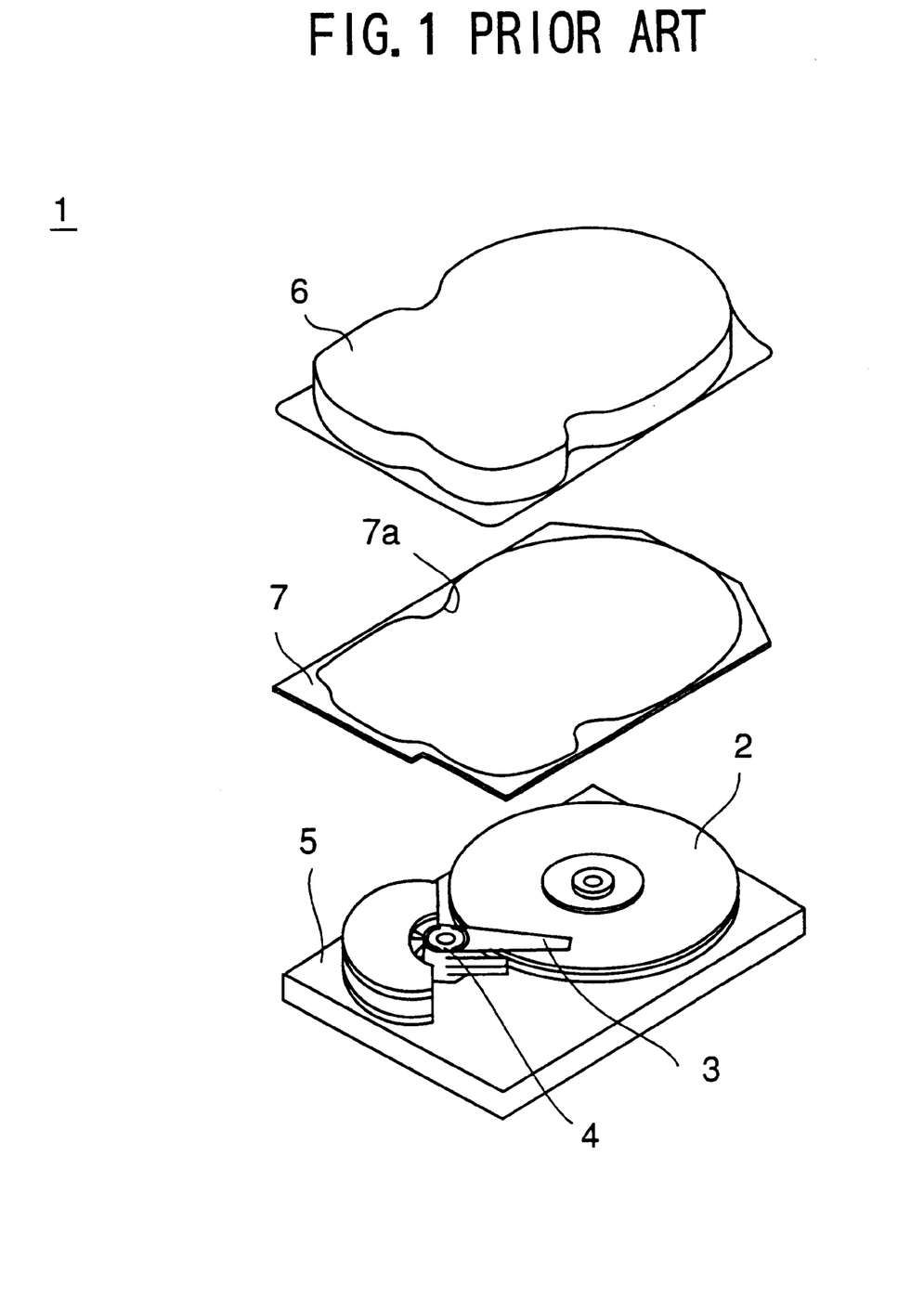
FIG. 1 is a disassembled perspective view of a conventional magnetic disk drive.
Figure 2:
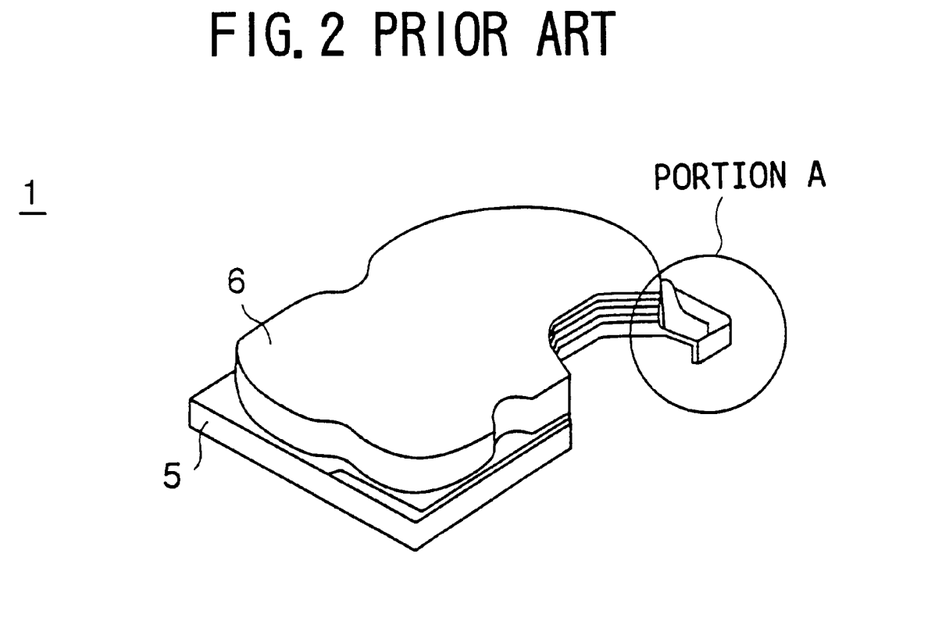
FIG. 2 is a partial perspective cross-sectional view of a conventional magnetic disk drive.
Figure 3:
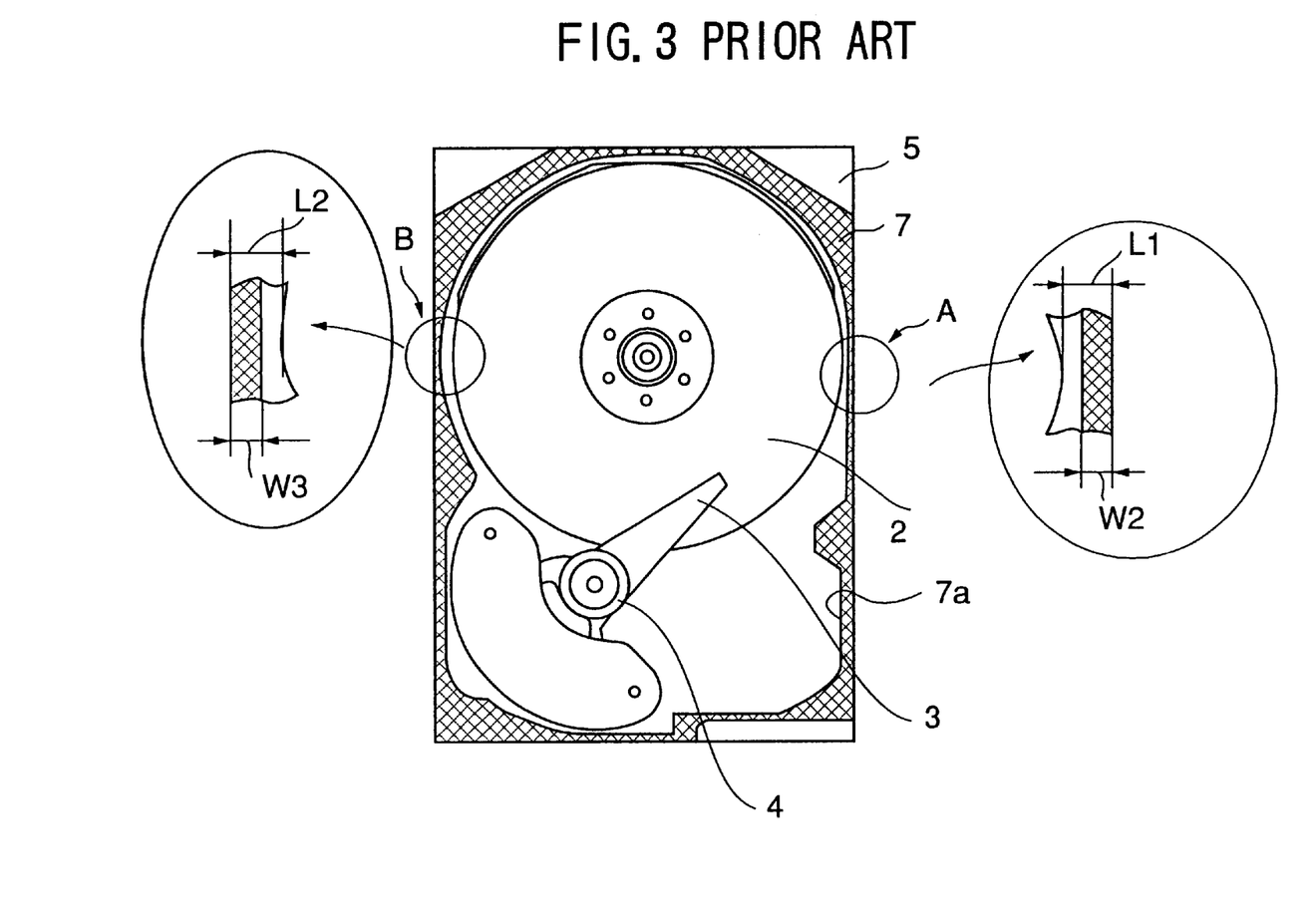
FIG. 3 is a plan view showing a conventional magnetic disk drive prior to the installation of the cover.
Figure 4:
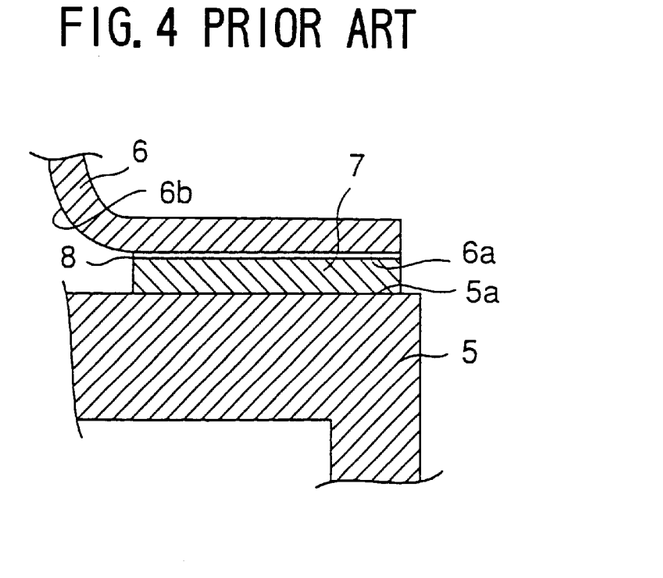
FIG. 4 is a partial cross-sectional view of a conventional magnetic disk drive, illustrating a case in which the packing is properly mounted.
Figure 5:
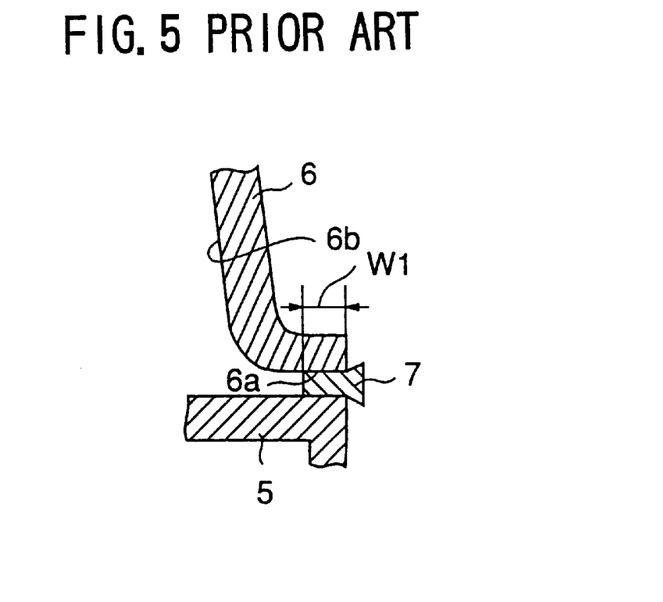
FIG. 5 is a partial cross-sectional view of a conventional magnetic disk drive, illustrating a case in which the packing is deformed and protrudes beyond the contact surfaces.
Figure 6:
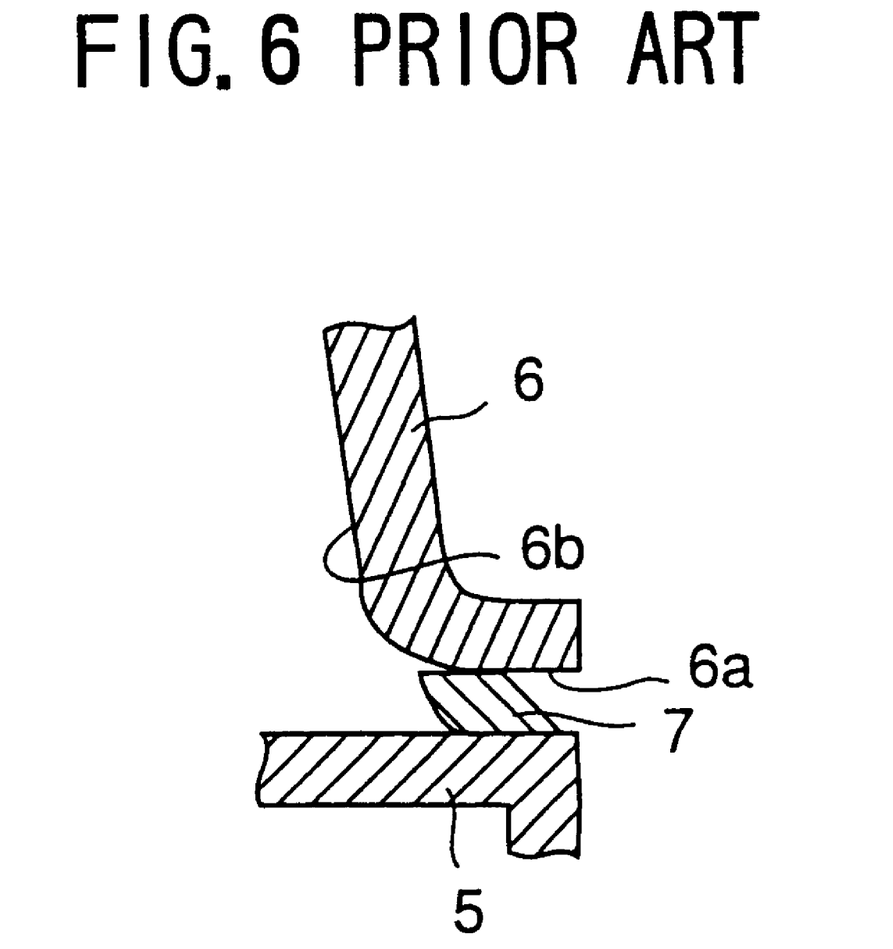
FIG. 6 is a partial cross-sectional view of a conventional magnetic disk drive, illustrating a case in which the packing has collapsed to one side.

FIG. 1 is a disassembled perspective view of a conventional magnetic disk drive. FIG. 2 is a partial perspective cross-sectional view of a conventional magnetic disk drive. FIG. 3 is a plan view showing a conventional magnetic disk drive prior to the installation of the cover. FIG. 4 is a partial cross-sectional view of a conventional magnetic disk drive, illustrating a case in which the packing is properly mounted. FIG. 5 is a partial cross-sectional view of a conventional magnetic disk drive, illustrating a case in which the packing is deformed and protrudes beyond the contact surfaces. FIG. 6 is a partial cross-sectional view of a conventional magnetic disk drive, illustrating a case in which the packing has collapsed to one side.

As shown for example in FIGS. 1 and 2, a conventional magnetic disk drive 1 may have a disk-like recording medium (hereinafter disk or magnetic disk) mounted on a motor assembly not shown in the drawing, an actuator 4 that supports a head 3, and other electronic components not shown in the drawings, all mounted atop a base 5. The base 5 is in turn covered by a cover 6 having a substantially concave structure capable of accommodating the electronic components therewithin, the base 5 and the cover 6 forming a single unit.

In order to seal the space enclosing the actuator 4 and other electronic components inside the concave structure that is the cover 6, as shown in FIGS. 1 and 3, a thin sheet of packing 7 made of rubber and having a through-hole portion 7a corresponding to the concave shape of the cover is inserted between the cover 6 and the base 5, specifically between the respective contact surfaces 6a and 5a thereof. It should be noted that, in these and other diagrams, the packing 7 may be given a mesh design as necessary in order to distinguish it from other components.

When assembling the magnetic disk drive 1, for example, double-sided adhesive tape 8 cut to a shape identical to that of the packing 7 is adhered to the packing 7, such that the adhesive force of the tape 8 contacts the packing 7 against the flange-like contact surface 6a of the cover 6. The cover 6 is then positioned on the base 5 with the contact surface 6a facing downward, to achieve a state depicted in FIG. 4, which is essentially an enlarged view of a portion A of FIG. 2. Thereafter the cover 6 and the base 5 are formed into a single unit by a tightening member not shown in the diagram.

At this time, a restorative force generated by the compressive deformation of the packing 7 due to the tightening of the tightening member securely contacts the packing 7 against both the cover 6 and the base 5, thus sealing the actuator 4 and other components.

However, in the case of the magnetic disk drive 1 described above, for example as shown in FIG. 3, at points A and B the distances L1 and L2 from the outer edge of the disk 2 to the outer edge of the base 5 are small in comparison to other areas, as can be seen in FIG. 5. Reducing the distances L1 and L2 in this manner, however, is unavoidable if the intent is to make the magnetic disk drive 1 more compact.

However, at points at which distances are small, the widths W1 of the cover 6 contact surface 6a (the flange surface) and the base 5 contact surface 5a that contacts the contact surface 6a, which in turn means that widths W2, W3 of the packing 7 positioned between the base 5 and the cover 6 decreases as well. As a result, when positioning the cover 6 atop the base 5 a slight misalignment arises, such that when the packing 7 is compressed as shown in FIG. 5 the packing 7 protrudes beyond the flange-like contact surface 6a of the cover 6 and the contact surface 5a of the base 5. In this case, a predetermined restorative force of the packing 7 does not extend to the base 5 and the cover 6 and accordingly the seal formed by the packing 7 is inadequate and thus the sealing of the electronic components is also poor. Such lapses in quality can cause the packing to collapse to one side as shown in FIG. 6 or take on other extreme deformations, degrading the quality of the seal even further.

BRIEF SUMMARY OF THE INVENTION

Accordingly, it is an object of the present invention to provide an improved and useful sealed structure for an electronic device in which the above-described disadvantage is eliminated.

The above-described object of the present invention is achieved by a sealed structure for an electronic device, the sealed structure comprising:

a base;

a concave cover enclosing electronic components of the electronic device when the cover is fitted to the base; and a gasket-like sealing member that fits between edge portions of the cover and the base to seal the enclosure, a rib portion being formed on at least one of either the cover or the base so as to prevent the sealing member from protruding from the edge portions of the cover and base.

According to this aspect of the invention, the sealing member can perform its designated sealing function because the sealing member can be prevented from protruding from the contact surface area, making it possible to provide an electronic device sealed structure with an improved seal.

Moreover, by providing the rib on either the inner periphery or the outer periphery of the sealing member, an improved seal can still be attained with relatively less processing of the rib as compared to a case in which ribs are provided on both sides of the sealing member.

Additionally, providing the rib on the outer periphery of the sealing member is advantageous in those areas where the contact surface area is restricted and it would therefore be difficult to provide a rib on the inner periphery of the sealing member. Moreover, providing the rib on the outer periphery restricts any protrusion of the sealing member outward therefrom, thus securely preventing degradation of the seal.

Additionally, by providing a rib at discrete, non-continuous, intermittent points along the periphery of the sealing member, an improved seal can still be attained with relatively less processing than is the case when the rib is provided continuously along the periphery of the sealing member.

In this case, providing the rib in such a way as to alternate between inner and outer periphery positioning, so that there is no overlap between the inner periphery and the outer periphery of the ribs, has the advantage of reducing the processing required to form the rib.

It should be noted that, in the sealed structure for an electronic device according to the present invention, by providing the rib at only those regions at which the contact surfaces are narrow (that is, the distance between the inner periphery and outer periphery is relatively small) and which can therefore be expected to be points at which the risk of the sealing member protruding outward from the structure is greatest, an improved seal can still be attained with only partial provision of the rib and thus with reduced processing as compared to a full rib extending the length of the periphery of the sealed structure.

It will be appreciated by those of ordinary skill in the art that such regions of reduced contact surface area can be determined easily as a matter of design.

Additionally, in the sealed structure for an electronic device according to the present invention, the side of the rib that contacts the sealing member has a slanted surface and the side of the sealing member that contacts the rib has a surface slanted in reverse to that of the rib, so that a deformation of the sealing member in a direction of a width thereof can be more securely restricted so as to provide an improved seal.

Other objects, features and advantages of the present invention will become more apparent from the following detailed description when read in conjunction with the accompanying drawings.

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

It should be noted that, for illustrative purposes only, the electronic device referenced in the following description is a conventional magnetic disk drive. Moreover, the basic structure of such a magnetic disk drive is identical to that of the conventional magnetic disk drive 1 described above, including a magnetic disk 2 mounted on a motor assembly not shown in the diagram, an actuator 4 that supports a head 3 and which, together with other electronic components not shown in the diagram, are arranged atop a base 5. The base 5 is covered by a cover 6 having a concave shape for accommodating the various electronic components (see for example the portion in FIG. 8 with reference numeral 6b), with the base 5 and the cover 6 forming a single unit. In order to seal the space that encloses the actuator 4 and the other electronic components, a thin, sheet-like packing 7 (sealing member) made of an elastic material such as rubber is disposed between the contact surfaces 6a and 5a of the cover 6 and the base 5, respectively, the packing 7 having a through-hole portion 7a corresponding to the concave portion of the cover 6.

A description will now be given of a sealed structure for a magnetic disk drive according to a first embodiment of the present invention, with reference to FIG. 7 and FIG. 8.

A magnetic disk drive 10 is provided with a rib 12 disposed along an entire length of an outer periphery of the base 5, and on this point differs from the magnetic disk drive 1 described above.

Figure 8:
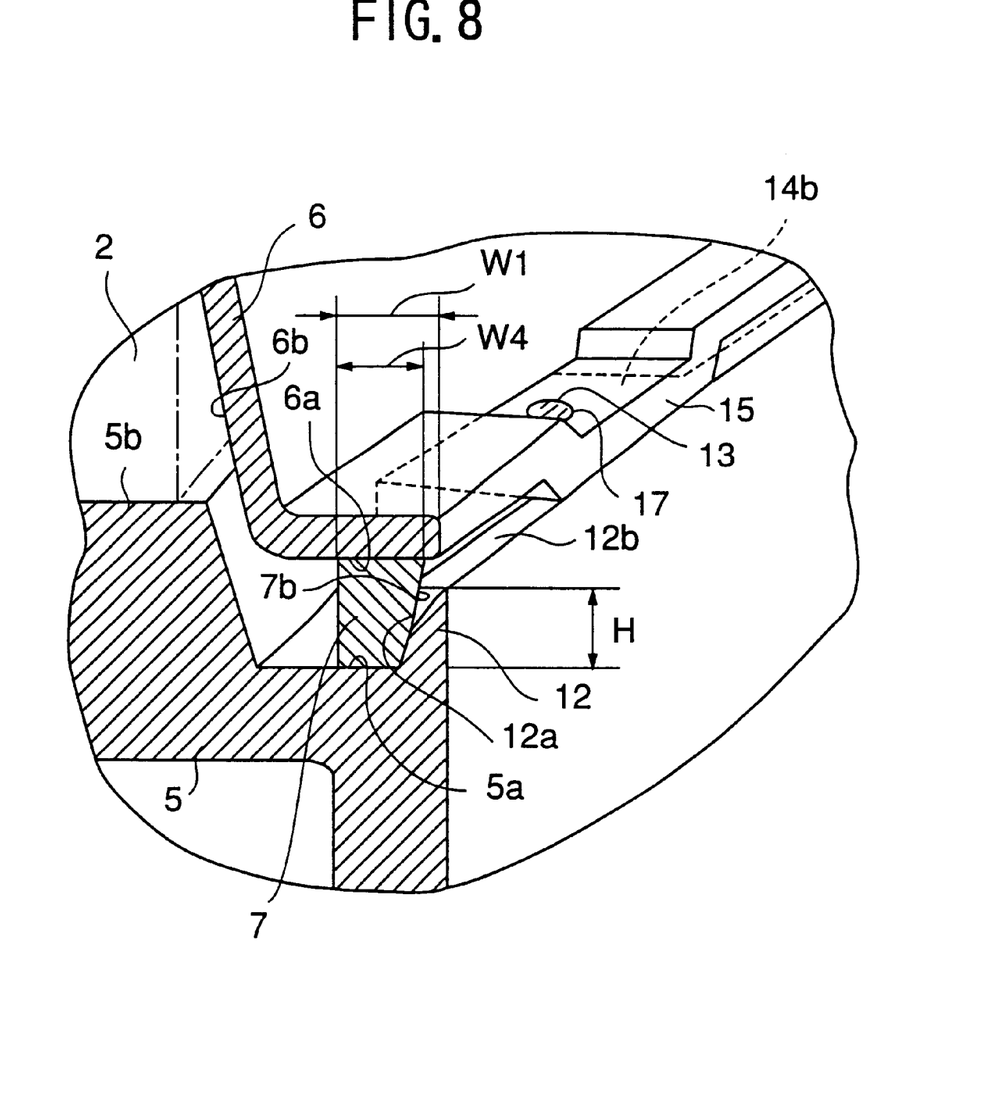
FIG. 8 is a partial perspective view of the magnetic disk drive according to the first embodiment of the present invention, for the purpose of illustrating the state in which the packing is mounted therein.

The rib 12 has an inner wall 12a that slants progressively outward toward a top of the wall 12a (see FIG. 8).

Figure 7:
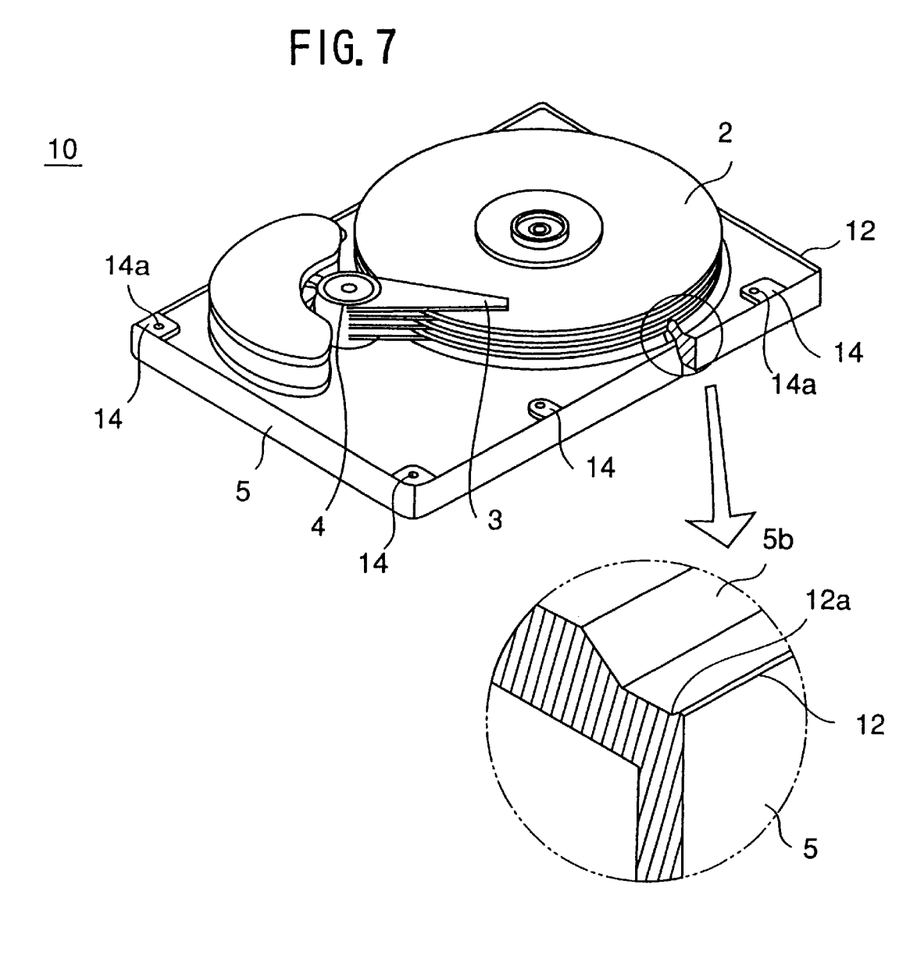
FIG. 7 is a partial cross-sectional perspective view of the magnetic disk drive according to a first embodiment of the present invention, with the cover removed.

Additionally, as can be seen in FIG. 7, a plurality of inwardly projecting tab projections 14 having hole portions 14a are formed at intervals along an outer edge of the base 5 in place of the rib 12.

As can be seen in FIG. 8, the packing 7 disposed opposite the rib 12 has an outer surface 7b slanted at an angle exactly opposite that of the inner wall 12a of the rib 12. A thickness of the packing 7 is set so that, for example, a width W1 at a point A of the packing 7 is smaller than a width W4 of the contact surface 6a including the width of the rib 12. Additionally, a height of the packing 7 is formed to a predetermined height so as to exceed a height H of the rib 12 at least in a state in which the packing 7 is compressed between the cover 6 and the base 5 at assembly, the packing at this time compressedly deforming so as to generate a restorative force so as to produce a seal of predetermined strength.

It should be noted that, as with the conventional art, two-sided adhesive tape 8 not shown in the drawing is adhered to a top surface of the packing 7. Additionally, the projecting tab portions 14 are formed to the same height as the rib 12, so that a top surface 14b of the projecting tab portions 14 formed a flush surface with an upper surface 12b of the rib 12.

Further, it should be noted that, for ease of explanation, the dimensions shown in FIG. 8 differ slightly from actual dimensions.

When the cover 6 is to be installed on the base 5 (on which base the actuator 4 and other electronic components are mounted), initially the packing 7 is installed on the flange-like contact surface 6a of the cover via double-sided adhesive tape 8. Next, a hole portion 17 formed in a step-like fixing portion 15 on the cover 6 is aligned with the hole portion 14a in the projecting tab portion 14 and a bottom surface 15 of the fixing portion contacted with the top surface 14b of the projecting tab portion 14, and at the same time the cover 6 is positioned atop the base 5 in such a way that the outer slanted surface 7b of the packing 7 slidingly contacts the inner wall 12a of the rib 12. By further inserting a fixing member such as a screw 13 into the hole portion 17 and the hole portion 14a so as to join the fixing portion 15 and the projecting tab portion 14, the cover 6 and the base 5 are formed as a single unit.

At this time, the force with which the fixing member is attached seals the fixing portion 15 of the cover 6 against the projecting tab portion 14 of the base 5, and, at the same time, leaves a gap between the upper surface 12b of the rib 12 and the contact surface 6a of the cover 6. At this time the packing 7 squeezed between the contact surfaces 6a and 5a is compressively deformed to a thickness T that is slightly larger than the height H of the rib 12. Additionally, the outer slanted surface 7b of the packing 7 comes into contact with the inner wall 12a of the rib 12, thus restricting the protrusion of the packing 7 outside the area of the contact surfaces 6a and 5a (that is, to the right side of FIG. 8). Additionally, since the outer slanted surface 7b of the packing 7 is pressed closely against and positioned by the inner wall 12a of the rib 12, deformation of the packing 7 toward an exterior is almost completely forestalled. Similarly, the packing 7, having as it does a predetermined width W4, does not protrude inwardly from the region of the contact surfaces 6a, 5a (that is, to the left in FIG. 8).

Accordingly, the predetermined restorative force created by the compressive deformation of the packing 7 by the fixing member provides a secure seal between the cover 6, the base 5 and the packing 7, thus sealing the actuator 4 and other components within the space formed by the cover 6 and the base 5.

As can be appreciated, the sealed structure for the magnetic disk drive 10 according to the first embodiment of the present invention provides the rib 12 around only an outer edge of the base 5, thus maintaining an improved seal for the magnetic disk drive 10 while requiring relatively little processing as compared to a case in which the rib 12 is provided on both an inner and an outer edge of the base 5.

Further, as shown in FIG. 8, a mount portion 5b for mounting a magnetic disk 2 is formed on the base 5, on the inside of the inner surface of the packing 7. In the present embodiment, an outer edge of the mount portion 5b and the inside surface of the packing 7 are separated from each other. However, even if the outer edge of the mount portion 5b and the inside surface of the packing 7 contact each other the outer edge of the mount portion 5b performs the function of a rib positioned on the inside of the packing 7, thus preventing the packing 7 from protruding inwardly from the region of the contact surfaces 6a, 5a. As a result, an improved sealed structure for the magnetic disk drive 10 can still be attained even without the provision of a rib on the inside of the packing 7.

It should be further noted that with respect to the first embodiment of the present invention as described above, the rib 12 need not be positioned along the outer edge of the base 5 but may be positioned inward of the outer edge as well, so long as the rib 12 remains to the outside of the packing 7. Additionally, the inner surface 12a of the rib 12 and the outer surface 7b of the packing 7 need not be slanted. Further, the rib 12 may also be provided on an inner periphery of the packing 7 instead of an outer edge of the base 5.

A description will now be given of a sealed structure for a magnetic disk drive according to a second embodiment of the present invention, with reference to FIG. 9 and FIG. 10.

Figure 9:
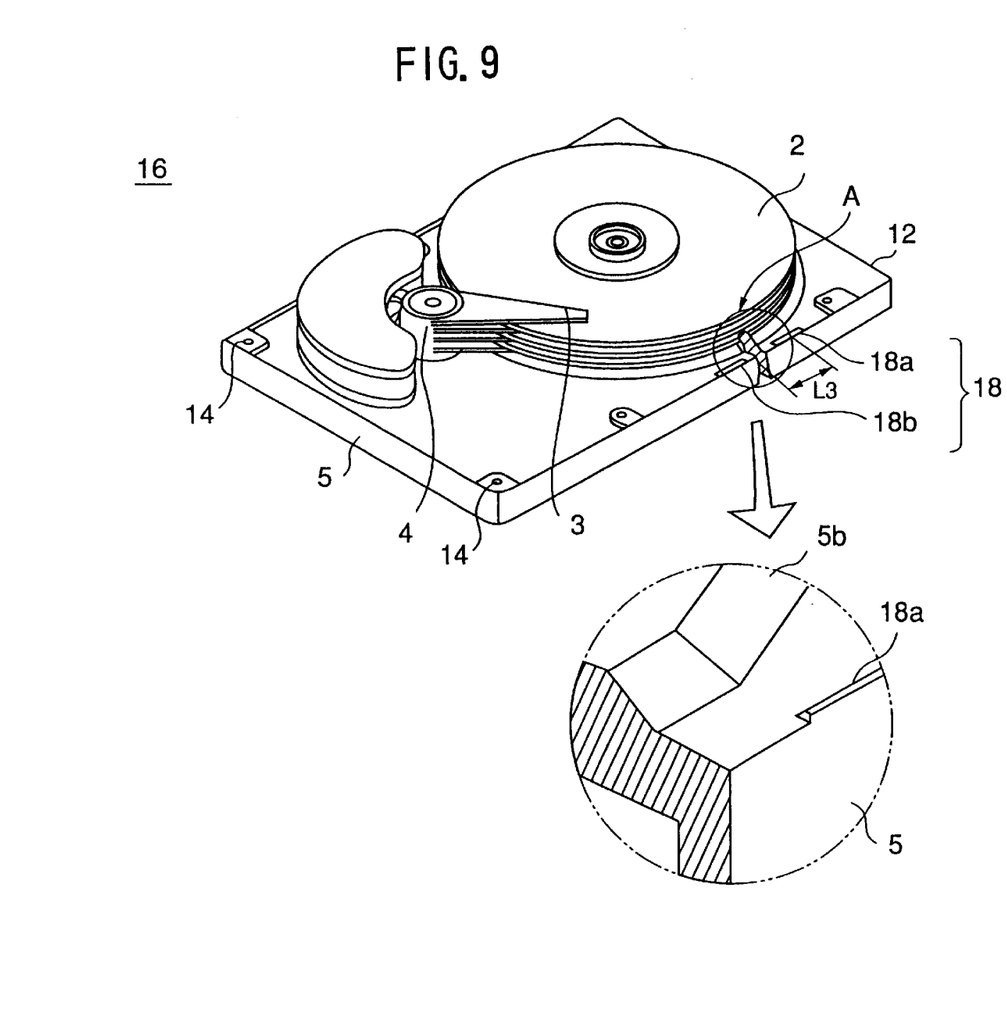
FIG. 9 is a partial cross-sectional perspective view of the magnetic disk drive according to a second embodiment of the present invention, with the cover removed.

FIG. 9 is a partial cross-sectional perspective view of the magnetic disk drive according to a second embodiment of the present invention, with the cover removed. FIG. 10 is a partial perspective view of the magnetic disk drive according to the second embodiment of the present invention, for the purpose of illustrating the state in which the packing is mounted therein.

As shown in FIG. 9, a rib 18 is formed selectively along the outer edge of the base 5 of the magnetic disk drive 16 at portions A, B where a width of the contact surfaces 6a and 5a of the cover 6 and the base 5 narrows. Additionally, the rib 18 is further divided into discrete, noncontinuous portions 18a, 18b.

The rib 18, like the rib 12 of the magnetic disk drive 10 described above, has slanted inner surfaces 18a-1, 18b-1 which slant outward toward the top of the rib. A distance L3 separating the ribs 18a, 18b is determined with reference to the elasticity, width and depth of the packing 7, and is small enough so that the packing 7 does not protrude outward from the gap L3 when the packing is compressed during positioning of the cover 6 on the base 5.

It should be noted that, just as is shown in FIG. 7, in FIG. 9 as well it can be seen that a plurality of projecting tab portions 14 in which hole portions 14a are formed are provided on an outer edge of the base 5. A detailed description of the purpose of the projecting tab portions 14 and the corresponding fixing portions 15, which, as described above, serve to align the cover 6 and the base 5, is unchanged for this and subsequent embodiments of the present invention and omitted hereinafter.

Figure 10:
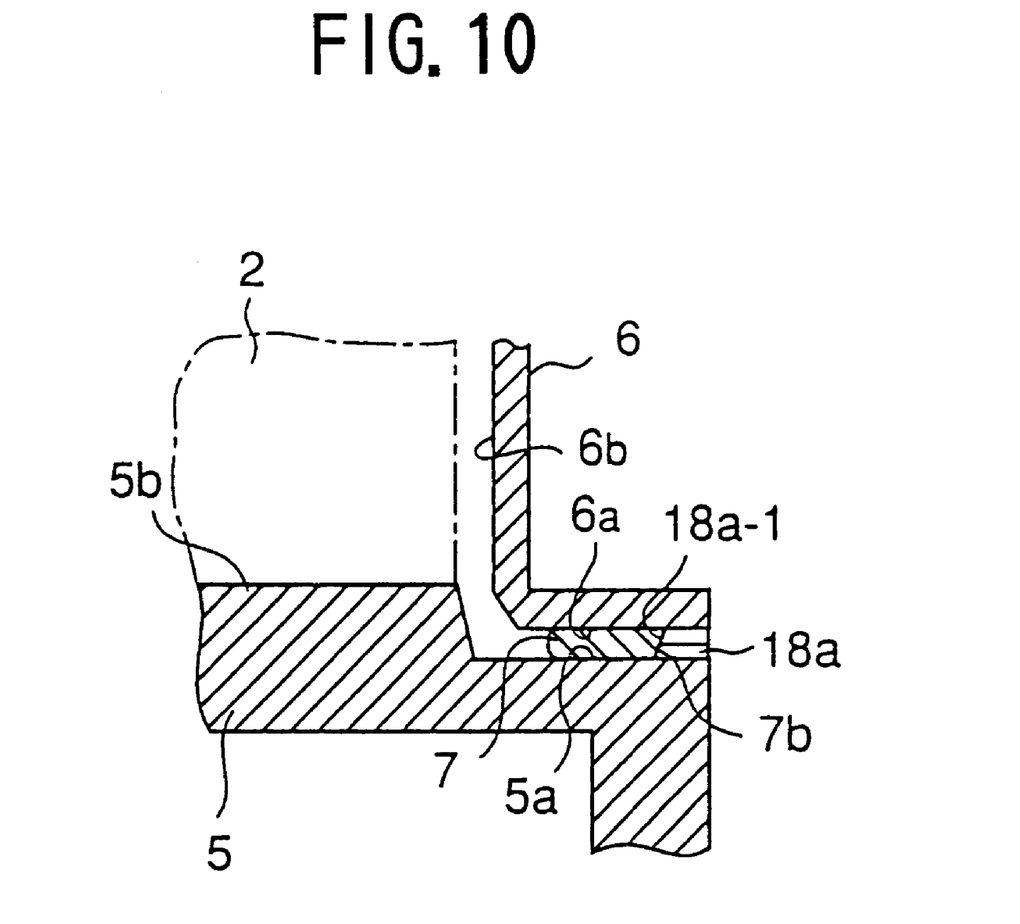
FIG. 10 is a partial perspective view of the magnetic disk drive according to the second embodiment of the present invention, for the purpose of illustrating the state in which the packing is mounted therein.

It should be noted that the packing 7, in correspondence to the rib 18, as shown in FIG. 10, has an outer surface 7b slanted at an angle exactly opposite that of the inner wall 12a of the rib 12, that is, slanted inward towards a bottom of the packing 7.

When the cover 6 is mounted on the base 5 (on which base 5 the actuator 4 and other electronic components are mounted), the packing 7 is first mounted on the flange-like contact surface 6a of the cover 6. Next, the cover 6 is positioned atop the contact surface 5a of the base 5 in such a way that the inner surface 7b of the packing 7 slidingly contacts the inner wall 12a of the ribs 18a, 18b. The cover 6 is then fixedly mounted on the base 5.

At this time, the packing 7, which is squeezed between the contact surfaces 6a, 5a by the force with which the fixing member is attached, though it may compressively deform, is nevertheless restricted from protruding outwardly beyond the region of the contact surfaces by the rib portions 18a and 18b. In particular, the outer slanted surface 7b of the packing 7c comes into contact with the inner walls 18a-1 and 18b-1 of the rib portions 18a, 18b, so deformation of the packing 7 toward an exterior (that is, to the right in FIG. 10) is almost completely forestalled. It should further be noted that the above-described gap L3 between rib portions 18a, 18b is set to be small, such that no packing protrudes through this gap. Additionally, the outer slanted surface 7b of the packing 7 contacts and is positioned by the inner walls 18a-1 and 18b-1 of the rib portions 18a and 18b, so the packing 7 does not protrude inwardly from the region of the contact surfaces 6a, 5a (that is, to the left in FIG. 10).

Accordingly, the predetermined restorative force created by the compressive deformation of the packing 7 by the fixing member provides a secure seal between the cover 6, the base 5 and the packing 7, thus sealing the actuator 4 and other components within the space formed by the cover 6 and the base 5.

As can be appreciated, the sealed structure for the magnetic disk drive 16 according to the second embodiment of the present invention selectively provides the noncontinuous rib 18 around an outer edge of the base 5 at those regions at which the contact surfaces are narrow and which can therefore be expected to be points at which the risk of the sealing member protruding outward from the structure are greatest, thus maintaining an improved seal for the magnetic disk drive 10 while requiring relatively little processing as compared to a case in which the rib 12 is provided on both an inner and an outer edge of the base 5.

Next, a description will be given of a sealed structure for a magnetic disk drive according to a third embodiment of the present invention, with reference to FIGS. 11 and 12.

Figure 11:
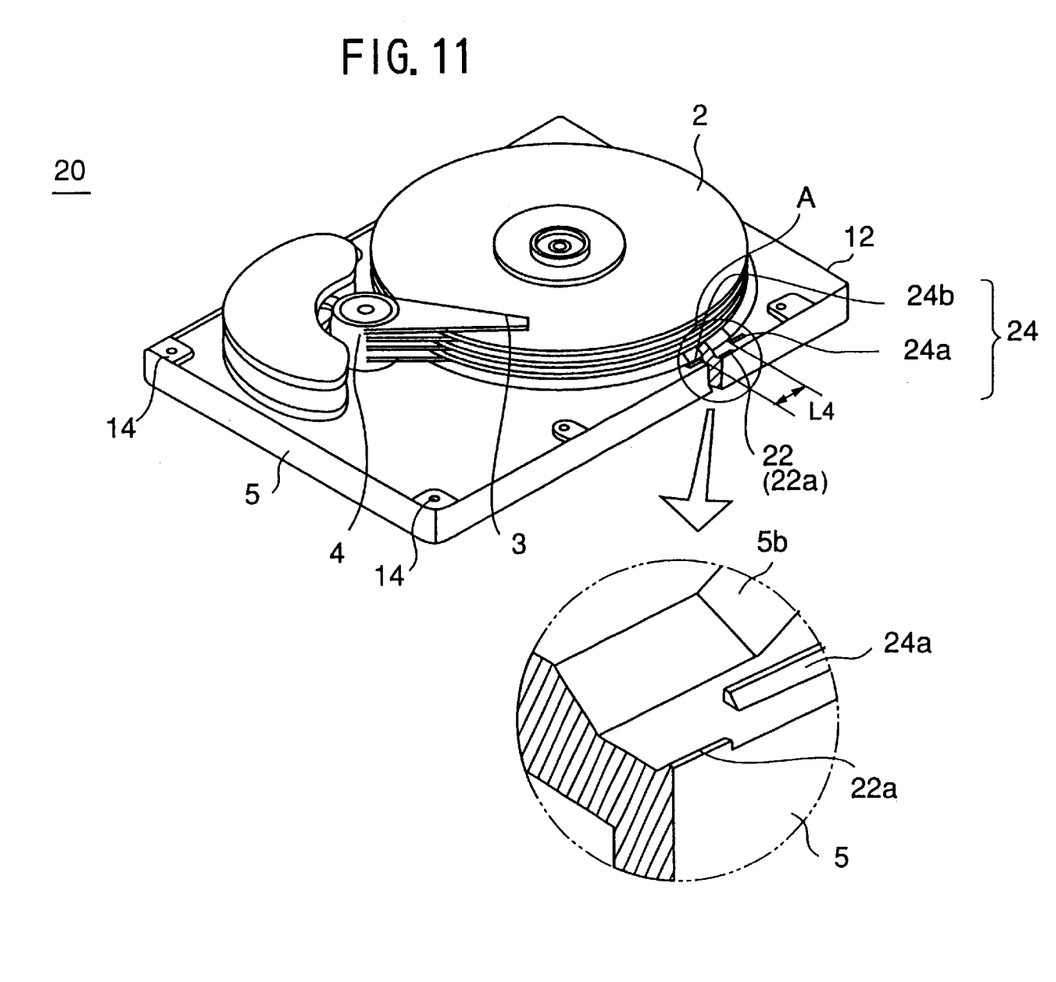
FIG. 11 is a partial cross-sectional perspective view of the magnetic disk drive according to a third embodiment of the present invention, with the cover removed.

FIG. 11 is a partial cross-sectional perspective view of the magnetic disk drive according to a third embodiment of the present invention, with the cover removed. FIG. 12 is a partial perspective view of the magnetic disk drive according to the second embodiment of the present invention, for the purpose of illustrating the state in which the packing is mounted therein.

The sealed structure for the magnetic disk drive 20, like the sealed structure for the magnetic disk drive 16 according to the second embodiment of the present invention as described above, provides a rib selectively formed at which the contact surfaces 6a, 5a of the cover 6 and the base 5, respectively, are narrow (refer to FIG. 3 for an example of such a portion, labeled herein as B). The difference between the present embodiment and the second embodiment is that two ribs 22, 24 are formed on the outer periphery of the base 5, rib 22 being formed along the outer edge of the base 5 and rib 24 being formed on an inner side of the packing, at a distance sufficient to accommodate a width of the packing. Moreover, each of the ribs 22, 24 is divided into rib portions 22a, 24a and 24b (see FIG. 11).

Figure 12:
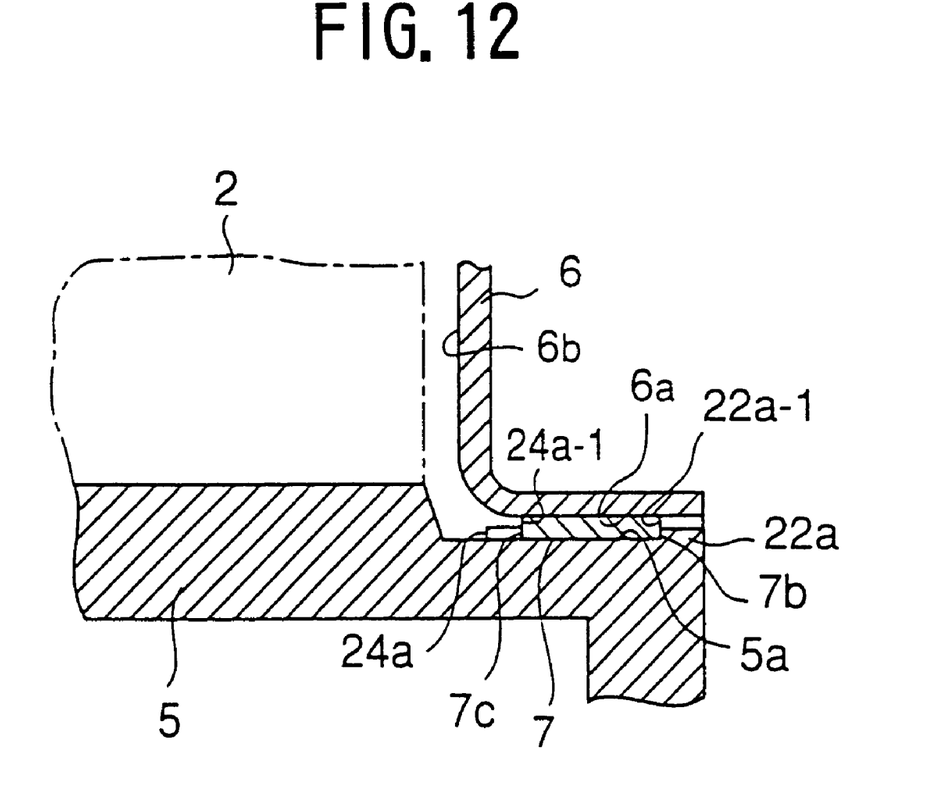
FIG. 12 is a partial perspective view of the magnetic disk drive according to the second embodiment of the present invention, for the purpose of illustrating the state in which the packing is mounted therein.

The rib 22 (that is, rib portion 22a) has an inner side wall 22a-1 that contacts the packing 7 that slants outward toward a top of the rib (to the right in FIG. 12), and rib portions 24a, 24b having outer side walls 24a-1, 24b-1 that slant inward toward a top thereof (to the left in FIG. 12; 24b-1 not shown in FIG. 12). A distance L4 separating the ribs 18a, 18b is determined with reference to the elasticity, width and depth of the packing 7, and is small enough so that the packing 7 does not protrude inward from the gap L4 when the packing is compressed during positioning of the cover 6 on the base 5.

The packing 7, in correspondence to the ribs 22, 24, has outer and inner slanted surfaces 7b, 7c tapered so as to be narrower at the bottom.

When the cover 6 is mounted on the base 5 (on which base 5 the actuator 4 and other electronic components are mounted), the packing 7 is first mounted on the flange-like contact surface 6a of the cover 6. Next, the cover 6 is positioned atop the contact surface 5a of the base 5 in such a way that the packing 7 is positioned between the two ribs 22 and 24. The cover 6 is then fixedly mounted on the base 5.

At this time, the packing 7, which is squeezed between the contact surfaces 6a, 5a by the force with which the fixing member is attached, though it may compressively deform, is nevertheless restricted from protruding outwardly (that is, to the right in FIG. 12) beyond the region of the contact surfaces 6a, 5a by the rib portion 22a. Additionally, the packing 7 is prevented from protruding inwardly (that is, to the left in FIG. 12) beyond the contact surfaces 6a, 5a by the rib portions 24a, 24b. It should be noted that the above-described gap between rib portions 24a, 24b is set to a predetermined distance L4, small enough to prevent packing 7 from protruding through this gap.

Accordingly, the predetermined restorative force created by the compressive deformation of the packing 7 by the fixing member provides a secure seal between the cover 6, the base 5 and the packing 7, thus sealing the actuator 4 and other components within the space formed by the cover 6 and the base 5.

The sealed structure for a magnetic disk drive 16 according to this third embodiment of the present invention, like that of the second embodiment described above, selectively provides the noncontinuous ribs 22 and 24 around an outer edge of the base 5 at those regions at which the contact surfaces are narrow and which can therefore be expected to be points at which the risk of the sealing member protruding outward from the structure are greatest, thus maintaining an improved seal for the magnetic disk drive 20 while requiring relatively little processing as compared to a case in which the rib 12 is provided on both an inner and an outer edge of the base 5.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-267620, filed on Sep. 4, 2000, the contents of which are hereby incorporated by reference.

What is claimed is:

1. A sealed structure for an electronic device, the sealed structure comprising:
   a base;
   a concave cover enclosing electronic components of the electronic device when the cover is fitted to the base;
   a gasket-like sealing member that fits between edge portions of the cover and the base to seal the enclosure; and
   a rib portion formed on at least one of either the cover or the base so as to prevent the sealing member from protruding from the edge portions of the cover and base;
   wherein a contact surface of the rib portion that contacts the sealing member is slanted outward toward a top of the rib portion;
   a contact surface of the sealing member that contacts the rib portion is slanted inward toward a top of the sealing member;
   the base and the concave cover have contact surfaces configured and arranged to sandwich the sealing member therebetween so that the sealing member is pressed in a direction perpendicular to the contact surfaces;
   the rib portion prevents the protrusion of the sealing member in a direction parallel to the contact surfaces of the base and the concave cover; and
   a slanting angle of the contact surface of the sealing member is equal to a reverse of the slanting angle of the contact surface of the rib portion.

2. The sealed structure for an electronic device as claimed in claim 1, wherein the rib portion is provided on one of either an inner side or an outer side of the sealing member.

3. The sealed structure for an electronic device as claimed in claim 2, wherein the rib portion is disposed at a periphery of the sealing member at positions of reduced width of a contact surface between the edge portions of the cover and the base.

4. The sealed structure for an electronic device as claimed in claim 3, wherein the rib portion comprises a plurality of discrete, non-continuous sub-portions provided on an outer side of the sealing member.

5. A sealed structure for an electronic device, the sealed structure comprising:
   a base;
   a concave cover enclosing electronic components of the electronic device when the cover is fitted to the base;
   a gasket-like sealing member that fits between edge portions of the cover and the base to seal the enclosure; and
   a rib portion formed on at least one of either the cover or the base so as to prevent the sealing member from protruding from the edge portions of the cover and base,
   wherein the rib portion comprises a plurality of discrete, non-continuous sub-portions disposed at alternating positions on the inner and outer sides of the sealing member.

* * * * *